United States Patent
Kang et al.

(10) Patent No.: US 11,599,488 B2
(45) Date of Patent: Mar. 7, 2023

(54) ELECTRONIC DEVICE, INTERRUPT CONFIGURATION CONTROL METHOD, AND STORAGE MEDIUM

(71) Applicant: Electronics and Telecommunications Research Institute, Daejeon (KR)

(72) Inventors: Dong Wook Kang, Daejeon (KR); Dae Won Kim, Daejeon (KR); Jin Yong Lee, Daejeon (KR); Boo Sun Jeon, Daejeon (KR); Bo Heung Chung, Daejeon (KR); Hong Il Ju, Daejeon (KR); Joong Yong Choi, Sejong-si (KR); Ik Kyun Kim, Daejeon (KR); Byeong Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 232 days.

(21) Appl. No.: 17/104,409

(22) Filed: Nov. 25, 2020

(65) Prior Publication Data

US 2021/0165752 A1 Jun. 3, 2021

(30) Foreign Application Priority Data

Nov. 28, 2019 (KR) .................. 10-2019-0155329

(51) Int. Cl.
*G06F 13/24* (2006.01)
*G06F 9/455* (2018.01)

(52) U.S. Cl.
CPC .......... *G06F 13/24* (2013.01); *G06F 9/45533* (2013.01); *G06F 2213/24* (2013.01)

(58) Field of Classification Search
CPC .. G06F 13/24; G06F 9/30101; G06F 9/45533; G06F 9/4812
See application file for complete search history.

(56) References Cited

U.S. PATENT DOCUMENTS 7,685,635 B2 3/2010 Vega et al.
10,275,374 B2 * 4/2019 Lee ...................... H02M 5/458
(Continued)

FOREIGN PATENT DOCUMENTS

KR 10-2006-0097597 9/2006
KR 10-1936565 1/2019

*Primary Examiner* — Phong H Dang
(74) *Attorney, Agent, or Firm* — Kile Park Reed & Houtteman PLLC

(57) ABSTRACT

An electronic device includes a peripheral device, a processor, an interrupt controller configured to manage interrupts generated by the peripheral device and the processor on the basis of a register, and a virtualizer, wherein the virtualizer may be configured to virtualize a portion of the processor and a portion of the at least one peripheral device to generate a first partition, generate first interrupt information corresponding to an interrupt usable in the first partition, generate first processor information corresponding to a portion of the processor usable in the first partition, check whether a configuration of the register is related to at least one of the first interrupt information and the first processor information when the register is configured by the first partition, and allow the configuration of the register when the configuration of the register is related to the at least one information.

20 Claims, 8 Drawing Sheets

(56) References Cited

U.S. PATENT DOCUMENTS

| | | | |
|---|---|---|---|
| 2006/0075207 A1* | 4/2006 | Togawa | G06F 9/45537 |
| | | | 711/202 |
| 2012/0151111 A1 | 6/2012 | Jung | |
| 2014/0047150 A1* | 2/2014 | Marietta | G06F 9/5077 |
| | | | 710/264 |
| 2016/0085568 A1* | 3/2016 | Dupre | G06F 9/4812 |
| | | | 718/1 |
| 2016/0098289 A1* | 4/2016 | Lim | G06F 9/45558 |
| | | | 718/1 |
| 2016/0210069 A1* | 7/2016 | Lutas | G06F 9/45558 |
| 2016/0246630 A1* | 8/2016 | Tsirkin | H04L 63/104 |
| 2016/0328339 A1* | 11/2016 | Ozguner | G06F 13/1668 |
| 2019/0361818 A1* | 11/2019 | Ichikawa | G06F 12/1458 |
| 2020/0264911 A1* | 8/2020 | Raisch | G06F 9/4812 |
| 2021/0089651 A1* | 3/2021 | Baranwal | G06F 21/75 |

\* cited by examiner

ELECTRONIC DEVICE, INTERRUPT CONFIGURATION CONTROL METHOD, AND STORAGE MEDIUM

CROSS-REFERENCE TO RELATED APPLICATION

This application claims priority to and the benefit of Korean Patent Application No. 10-2019-0155329, filed on Nov. 28, 2019, the disclosure of which is incorporated herein by reference in its entirety.

BACKGROUND

1. Field of the Invention

Various embodiments disclosed herein relate to an interrupt configuration control technique.

2. Discussion of Related Art

Computer manufacturers want to maximize market share by allowing a large number of applications to run on central processing units (CPUs) provided by the computer manufacturers. In order to increase the number of operating systems and application programs executable in a computer system, an emulator program for supporting a host computer (a computer with a host CPU) to emulate (or virtualize) a guest computer (a computer with a guest CPU of a different family from that of the host CPU) has been disclosed. An emulator program (a virtualizer) creates an emulation environment and performs a function of interchange between the hardware architecture of a host computer and software executed in an emulation environment. A virtualizer (e.g., a virtual machine monitor (VMM) and a hypervisor) virtualizes guest hardware using software to create a virtual machine (hereinafter referred to as a partition) and makes use of the virtual machine to rely on a host operating system for functions required by a guest operating system.

SUMMARY OF THE INVENTION

A peripheral device (a guest central processing unit (CPU)) and a CPU (a host CPU), or a plurality of CPUs (e.g., host CPUs) may transmit or receive an interrupt in order to inform each other of an event requiring immediate processing. When each CPU receives an interrupt, the corresponding CPU may stop a running task and perform a task corresponding to the interrupt. However, when an interrupt transmitted by an arbitrary partition stops execution of partitions not related to the arbitrary partition, processing time may increase, or responsiveness may be reduced. Also, when multiple partitions are driven in a single hardware system (e.g., a host computer), for stable operation, influence between the partitions needs to be reduced as much as possible, and influence due to an interrupt also needs to be reduced.

Various embodiments disclosed herein may provide an electronic device, an interrupt configuration control method, and a storage medium which are capable of controlling interrupt configuration between partitions or CPUs.

An electronic device according to an embodiment disclosed herein may include at least one peripheral device, a processor, an interrupt controller configured to manage interrupts generated by the peripheral device and the processor on the basis of a register, and a virtualizer, wherein the virtualizer may be configured to virtualize a portion of the processor and a portion of the at least one peripheral device to generate a first partition, generate first interrupt information corresponding to an interrupt usable in the first partition, generate first processor information corresponding to a portion of the processor usable in the first partition, check whether a configuration of the register is related to at least one of the first interrupt information and the first processor information when the register is configured by the first partition, and allow the configuration of the register when the configuration of the register is related to at least one of the first interrupt information and the first processor information.

Also, an interrupt configuration control method according to an embodiment disclosed herein, which is performed by a processor, may include checking a configuration of a register included in an interrupt controller when a first partition configures the register, checking whether the configuration of the register is related to at least one of first interrupt information and first processor information allocated to the first partition; and allowing the configuration of the register when the configuration of the register is related to at least one of the first interrupt information and the first processor information.

Also, a computer-readable storage medium according to an embodiment disclosed herein may store processor-executable instructions, and the instructions may cause a processor of an electronic device to check a configuration of a register included in an interrupt controller when a first partition configures the register, check whether the configuration of the register is related to at least one of first interrupt information and first processor information allocated to the first partition, and allow the configuration of the register when the configuration of the register is related to at least one of the first interrupt information and the first processor information.

BRIEF DESCRIPTION OF THE DRAWINGS

In describing the drawings, like or similar reference numerals may be used for like or similar elements.

DETAILED DESCRIPTION OF EXEMPLARY EMBODIMENTS

Figure 1:
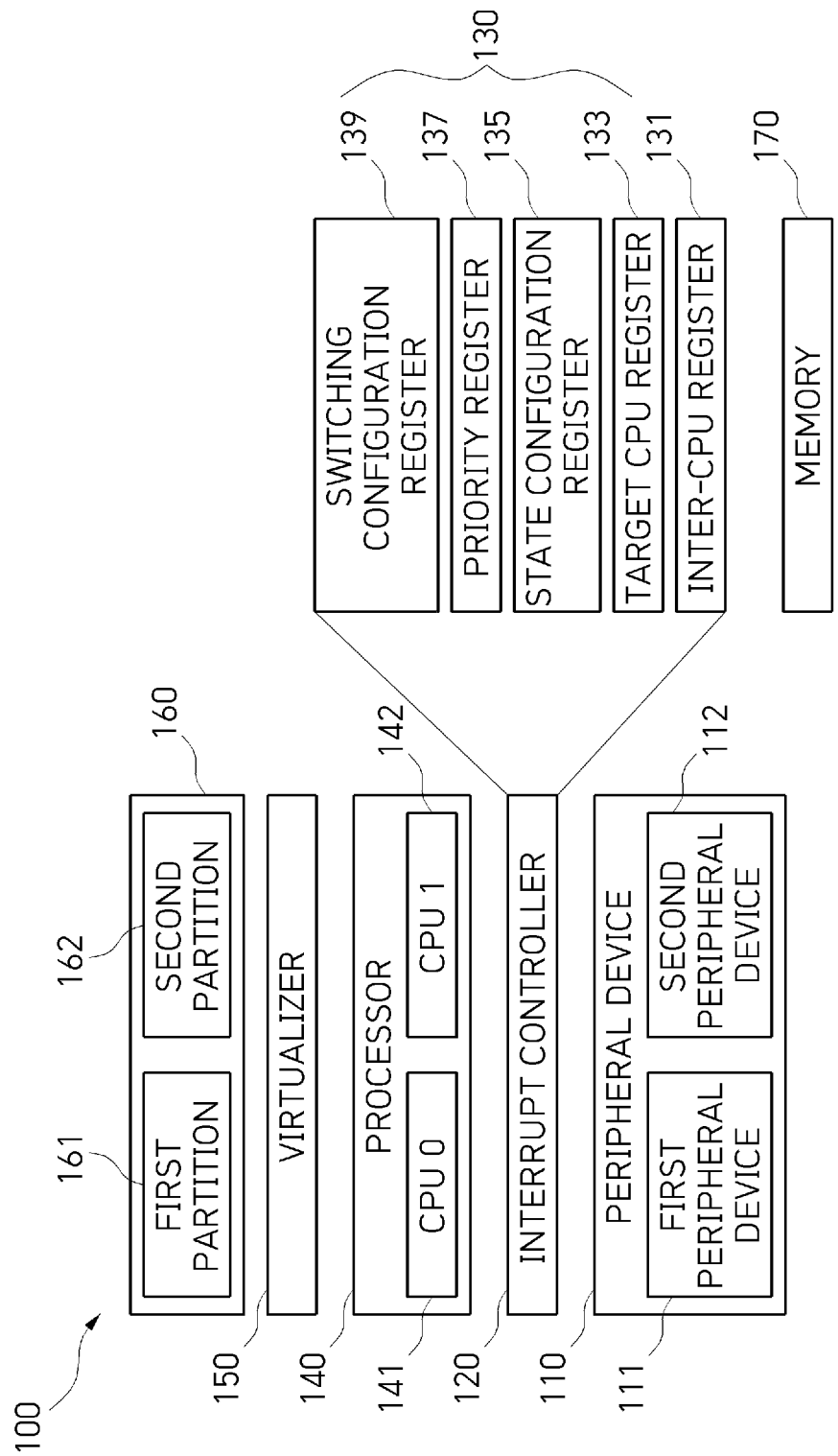
FIG. 1 shows a block diagram of an electronic device according to an embodiment.

FIG. 1 shows a block diagram of an electronic device according to an embodiment.

Referring to FIG. 1, an electronic device 100 according to an embodiment may include a peripheral device 110, an interrupt controller 120, a processor 140, a virtualizer 150, a plurality of partitions 160, and a memory 170.

According to an embodiment, the peripheral device 110 may include a first peripheral device 111 and a second peripheral device 112. The first peripheral device 111 and the second peripheral device 112 may include input/output devices such as a network interface card (NIC), a USB transceiver, and a universal asynchronous receiver-transmitter (UART).

According to an embodiment, the interrupt controller 120 may be disposed between at least one processor 140 and a peripheral device 110 to relay an interrupt between the peripheral device 110 and the processor 140 according to the configuration of interrupt registers 130. For example, when an interrupt generated by the peripheral device 110 or the processor 140 is received, the interrupt controller 120 may transmit the received interrupt to a target CPU.

According to an embodiment, the interrupt controller 120 provides an interface capable of monitoring the configuration and state of an interrupt to the processor 140 through the interrupt registers 130. The interrupt registers 130 may include a switching (Enable/Disable) configuration register 139, a priority register 137, a state (pending/active) configuration register 135, a target CPU register 133, and an inter-CPU register 131. The switching configuration register 139 may be a register for enabling or disabling transmission of an interrupt. The priority register 137 may be a register for configuring the priority of an interrupt. The state configuration register 135 may be a register for displaying or configuring the state of an interrupt. The state of an interrupt may include an inactive state, a pending state, an active state, and a pending and active state. The inactive state may be a state in which no interrupt is generated. The pending state may be a state in which an interrupt is generated but is not delivered to a target CPU. The active state may be a state in which an interrupt is generated, delivered to a target CPU, and processed by the target CPU. The pending and active state may be a state in which an interrupt has been generated and delivered to a target CPU and in which the same interrupt is generated and pending. The target CPU register 133 may be a register for configuring a target CPU which is to receive an interrupt. The inter-CPU register 131 may be a register for the processor 140 configuring an interrupt generated between CPUs 141 and 142 in a multi-core environment including a plurality of CPUs 141 and 142.

By executing at least one instruction, the processor 140 may control at least one other element (e.g., a hardware or software element) of the electronic device 100 and may perform various data processing or operations. For example, the processor 140 may include at least one of a central processing unit (CPU), a graphics processing unit (GPU), a microprocessor, an application processor, an application-specific integrated circuit (ASIC), and a field-programmable gate array (FPGA) and may have a plurality of cores. In the embodiment disclosed herein, a case in which the processor 140 is a dual-core process including a first CPU 141 and a second CPU 142 will be described as an example. However, the present invention is not limited thereto. For example, the processor 140 may be a single-core processor including one CPU or a processor including three or more CPUs.

A first partition 161 and a second partition 162 may be virtual machines that virtualize the first peripheral device 111 and the second peripheral device 112 through the virtualizer 150. For example, the first partition 161 may be a virtual machine that virtualizes the first peripheral device 111 and a portion (e.g., the first CPU 141) of the processor 140. The first partition 161 may execute, for example, a first application or a first guest operating system. As another example, the second partition 162 may be a second virtual machine that virtualizes the second peripheral device 112 and another portion (e.g., the first CPU 142) of the processor 140. The second partition 162 may execute, for example, a second application or a second guest operating system. The first partition 161 and the second partition 162 are mechanically driven by the portion of the processor 140 (e.g., the first CPU 141) and the other portion (e.g., the second CPU 142) of the processor 140, respectively. However, for convenience of description, the following description focuses on the first partition 161 and the second partition 162.

According to an embodiment, the virtualizer 150 may generate the first partition 161 and the second partition 162 by virtualizing at least one of the processor 140 and the peripheral device 110. For example, the virtualizer 150 may generate the first partition 161 by virtualizing the first peripheral device 111 and the portion (e.g., the first CPU 141) of the processor 140. The virtualizer 150 may generate the second partition 162 by virtualizing the second peripheral device 112 and the other portion (e.g., the second CPU 142) of the processor 140. The operations of the virtualizer 150 are mechanically executed by the processor 140. However, for convenience of description, the following description focuses on the virtualizer 150.

According to an embodiment, for example, when the first partition 161 is generated, the virtualizer 150 may generate first interrupt information for an interrupt allocated to the first partition 161 and may generate first processor information for a portion of the processor 140 allocated to the first partition 161 (or virtualized for the first partition 161). The first interrupt information may include an interrupt ID list allocated to the first partition 161. The first processor information may include a processor ID list allocated to the first partition 161. Likewise, for example, when the second partition 162 is generated, the virtualizer 150 may generate second interrupt information for an interrupt allocated to the second partition 162 and may generate second processor information for a portion of the processor 140 allocated to the second partition 162 (or virtualized for the second partition 162). The second interrupt information may include an interrupt ID list allocated to the second partition 162. The second processor information may include a processor ID list allocated to the second partition 162. According to various embodiments, the virtualizer 150 may allocate the same processor to the first partition 161 and the second partition 162. In this case, the virtualizer 150 may generate the first processor information and the second processor information including different pieces of time-division information on the same processor by allocating different usage times to the first partition 161 and the second partition 162.

According to an embodiment, the virtualizer 150 may deliver an interrupt generated in one of the peripheral device 110 and the processor 140 to a target CPU of the processor 140 on the basis of the configurations of the interrupt registers 130. The virtualizer 150 may include at least one of a host operating system, a hypervisor, and a virtual machine monitor (VMM).

According to an embodiment, when one of the interrupt registers 130 is configured by the first partition 161, the virtualizer 150 may check whether the configuration of the register is related to at least one of the first interrupt information and the first processor information. For example, the virtualizer 150 may check whether the configuration of the register is related to at least one of the first interrupt information and the first processor information on the basis of at least one of whether an interrupt ID corresponding to the configuration of the register is included in the first interrupt information and whether a processor ID corresponding to the configuration of the register is included in the first processor information.

According to an embodiment, when the configuration of the register performed by the first partition 161 is related to none of the first interrupt information and the first processor information, the virtualizer 150 may delete the configuration of the register which has been checked. On the other hand, when the configuration of the register is related to at least one of the first interrupt information and the first processor information, the virtualizer 150 may maintain the configuration of the register until an interrupt corresponding to the configured register is processed by a register controller.

According to an embodiment, when the register configured by the first partition 161 is the target CPU register 133, the virtualizer 150 may check whether the configured interrupt is related to the first interrupt information and the first processor information. When the configuration of the register is related to the first interrupt information and the first processor information, the virtualizer 150 may allow the configuration of the register. For example, when the ID of the configured interrupt is included in the first interrupt information and the ID of the target CPU corresponding to the ID of the configured interrupt is included in the first processor information, the virtualizer 150 may allow the configuration of the register for the corresponding interrupt. On the other hand, when the ID of the configured interrupt is not included in the first interrupt information and when the ID of the target CPU corresponding to the ID of the configured interrupt is not included in the first processor information, the virtualizer 150 may delete the configuration of the register for the corresponding interrupt.

According to an embodiment, when the register configured by the first partition 161 is the inter-CPU register 131, the virtualizer 150 may check whether the interrupt configured for the inter-CPU register 131 is related to the first processor information. When the configured interrupt is related to the first processor information, the virtualizer 150 may allow the configuration of the register. For example, when the target ID of the CPU related to the configured interrupt is included in the first processor information, the virtualizer 150 may allow the configuration of the register for the corresponding interrupt. On the other hand, when the target ID of the CPU related to the configured interrupt is not included in the first processor information, the virtualizer 150 may delete the configuration of the register for the corresponding interrupt.

According to an embodiment, when the register configured by the first partition 161 is the priority register 137, the switching configuration register 139, or the state configuration register 135, the virtualizer 150 may check whether an interrupt ID configured for each register is included in the first interrupt information. When the configured interrupt ID is included in the first interrupt information, the virtualizer 150 may allow the configuration of the register. On the other hand, when the configured interrupt ID is not included in the first interrupt information, the virtualizer 150 may delete the configuration of the register.

According to an embodiment, for example, the memory 170 may store commands or data related to at least one other element of the electronic device 100. The memory 170 may be a volatile memory (e.g., a random-access memory (RAM), etc.), a non-volatile memory (e.g., a read-only memory (ROM), a flash memory, etc.), or a combination thereof. The memory 170 may store instructions executable by the processor 140. When the instructions are executed, the instructions may cause the processor of the electronic device to check the configuration of the register when the first partition configures the register included in the interrupt controller, check whether the configuration of the register is related to at least one of the first interrupt information and the first processor information allocated to the first partition, and allow the configuration of the register when the configuration of the register is related to at least one of the first interrupt information and the first processor information.

According to the above-described embodiment, the electronic device (e.g., the virtualizer 150) may limit unnecessary interrupt processing of the interrupt controller 120 by allowing or deleting the configurations of the interrupt registers 130 included in the interrupt controller 120.

Also, according to the above-described embodiment, the electronic device 100 can reduce the influence on each partition due to an interrupt of another partition, and accordingly, can stably drive each partition.

Figure 2:
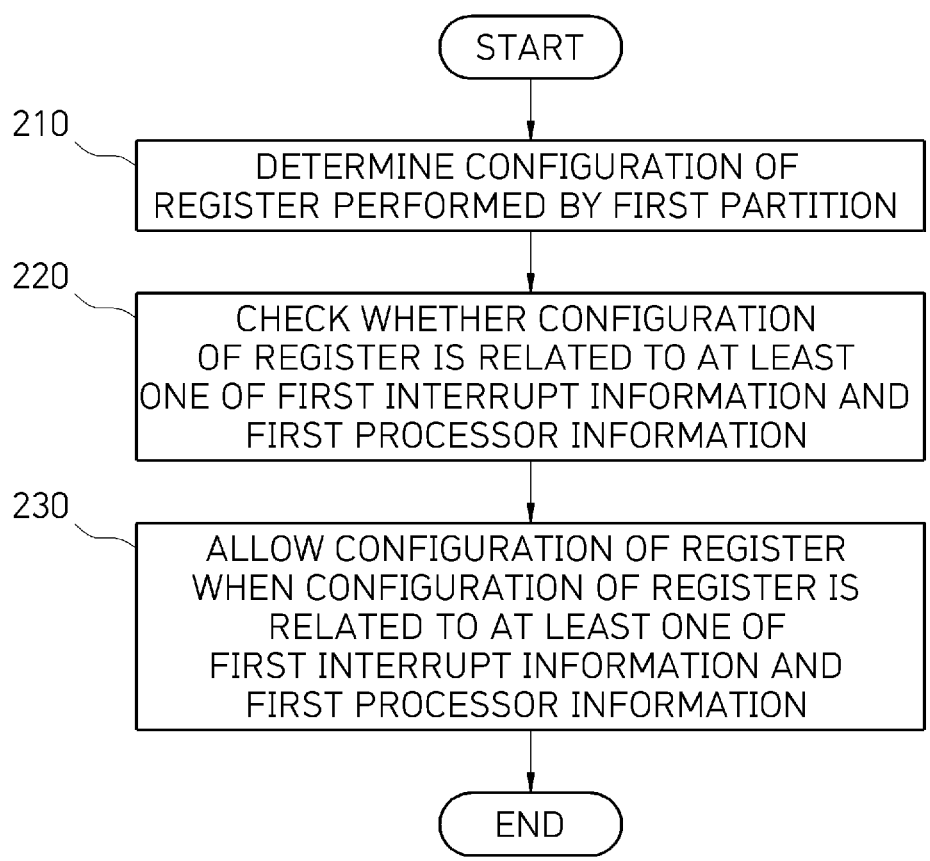
FIG. 2 shows a flowchart of an interrupt configuration control method according to an embodiment.

FIG. 2 shows a flowchart of an interrupt configuration control method according to an embodiment.

Referring to FIG. 2, in operation 210, when the first partition 161 configures one of the interrupt registers 130 included in the interrupt controller 120, the virtualizer 150 may determine that the register is configured by the first partition 161.

In operation 220, the virtualizer 150 may check whether the configuration of the register is related to at least one of first interruption information and first processor information. For example, the virtualizer 150 may check whether the configuration of the register is related to at least one of the first interrupt information and the first processor information on the basis of at least one of whether an interrupt ID corresponding to the configuration of the register is included in the first interrupt information and whether a processor ID corresponding to the configuration of the register is included in the first processor information depending on the type of register.

In operation 230, the virtualizer 150 may allow the configuration of the register when the configuration of the register is related to at least one of the first interrupt information and the first processor information. For example, when the configuration of the register is related to at least one of the first processor information and the first processor information, the virtualizer 150 may maintain the configuration of the register until an interrupt corresponding to the configured register is processed by the register controller. Unlike this, when the configuration of the register performed by the first partition 161 is related to none of the first interrupt information and the first processor information, the virtualizer 150 may delete the configuration of the register.

According to the above-described embodiment, the electronic device (e.g., the virtualizer 150) may limit unnecessary interrupt processing of the interrupt controller 120 by allowing or deleting the configurations of the interrupt registers 130 included in the interrupt controller 120.

Also, according to the above-described embodiment, the electronic device 100 can reduce the influence on each partition due to an interrupt of another partition, and accordingly, can stably drive each partition.

Figure 3:
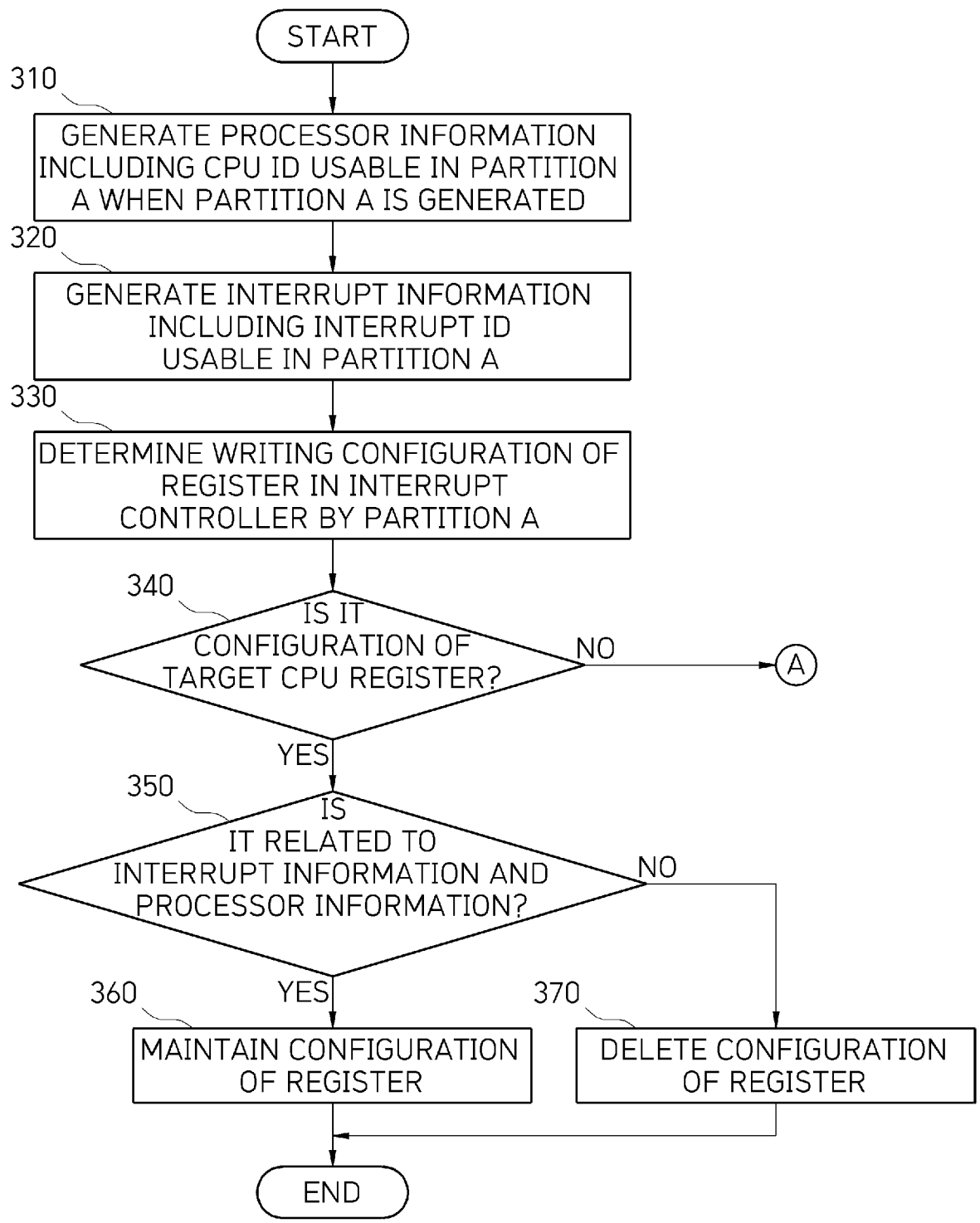
FIGS. 3 and 4 are detailed flowcharts of an interrupt configuration control method according to an embodiment.
Figure 4:
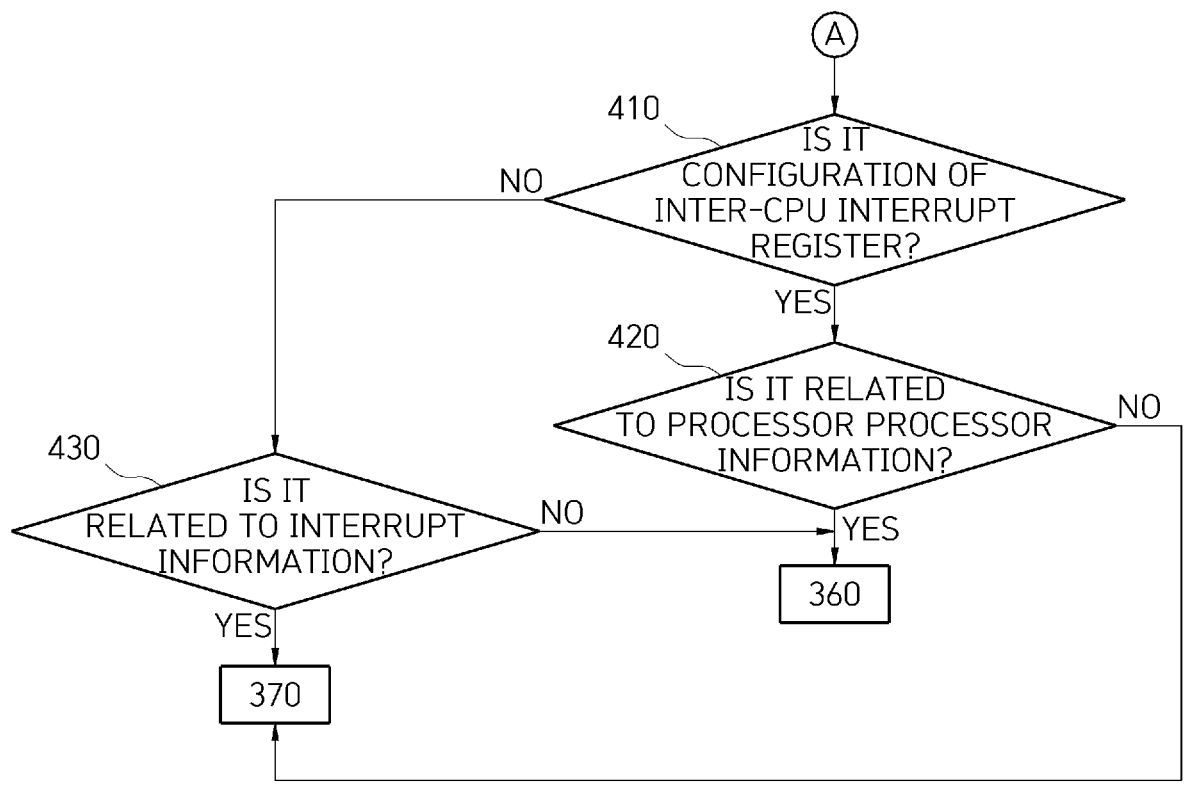

FIGS. 3 and 4 are detailed flowcharts of an interrupt configuration control method according to an embodiment.

Referring to FIG. 3, in operation 310, when any partition A (e.g., the first partition of FIG. 1) is generated, the virtualizer 150 may generate processor information (e.g., first processor information) including a CPU ID usable in the partition A.

In operation 320, the virtualizer 150 may generate interrupt information (e.g., first interrupt information) including an interrupt ID usable in the partition A.

In operation 330, the virtualizer 150 may determine writing configurations for the interrupt registers 130 in the interrupt controller 120 which are performed by the partition A.

When it is determined in operation 340 that the determined writing configuration is a writing configuration for a target CPU register 133, the virtualizer 150 may check whether the determined writing configuration is related to processor information and interrupt information corresponding to the partition A in operation 350. For example, the virtualizer 150 may check whether an interrupt ID and a processor ID corresponding to the determined writing configuration are included in the interrupt information and the processor information corresponding to the partition A, respectively.

Referring to FIGS. 3 and 4, when the virtualizer 150 determines that the determined writing configuration is a writing configuration for the inter-CPU register 131 in operation 410, the virtualizer 150 may check whether the determined writing configuration is related to the processor information corresponding to the partition A in operation 420. For example, the virtualizer 150 may check whether a processor ID corresponding to the determined writing configuration is included in the processor information corresponding to the partition A.

When it is determined in operation 410 that the determined writing configuration is a writing configuration for the switching configuration register 139, the priority register 137, or the state configuration register 135, the virtualizer 150 may check whether the determined writing configuration is related to interrupt information corresponding to the partition A in operation 430. For example, the virtualizer 150 may check whether an interrupt ID corresponding to the determined configuration is included in interrupt information corresponding to the partition A.

The virtualizer 150 may maintain the writing configuration for the register in operation 360 when it is determined in operation 350 that the determined writing configuration is related to the processor information and interrupt information corresponding to the partition A, when it is determined in operation 420 that the determined writing configuration is related to the processor information corresponding to the partition A, or when it is determined in operation 430 that the determined writing configuration is related to the interrupt information corresponding to the partition A.

The virtualizer 150 may delete the writing configuration for the register (i.e., restore a value prior to the configuration) in operation 360 when it is determined in operation 350 that the determined writing configuration is not related to the processor information and interrupt information corresponding to the partition A, when it is determined in operation 420 that the determined writing configuration is not related to the processor information corresponding to the partition A, or when it is determined in operation 430 that the determined writing configuration is not related to the interrupt information corresponding to the partition A.

As described above, according to the above-described embodiment, the electronic device (e.g., the virtualizer 150) may limit unnecessary interrupt processing of the interrupt controller 120 by allowing or deleting the configurations of the interrupt registers 130 included in the interrupt controller 120.

FIGS. 5 to 8 are diagrams illustrating comparisons between interrupt control of a conventional interrupt controller and interrupt control of an interrupt controller according to an embodiment. In FIGS. 5 to 8, the first partition 161 and the second partition 162 are driven by the first CPU 141 and the second CPU 142, respectively. In the following description, as an example, the first partition 161 receives and processes an interrupt IRQ37 with an interrupt ID of 37 and an interrupt IRQ62 with an interrupt ID of 62, and the second partition 162 receives and processes an interrupt IRQ41 with an interrupt ID of 41. In this case, the first interrupt information related to the first partition 161 may include interrupt IDs 37 and 67, and the first processor information may include an ID of the first CPU 141. The second interrupt information related to the second partition 162 may include interrupt ID 41, and the second processor information may include an ID of the second CPU 142.

Figure 5:
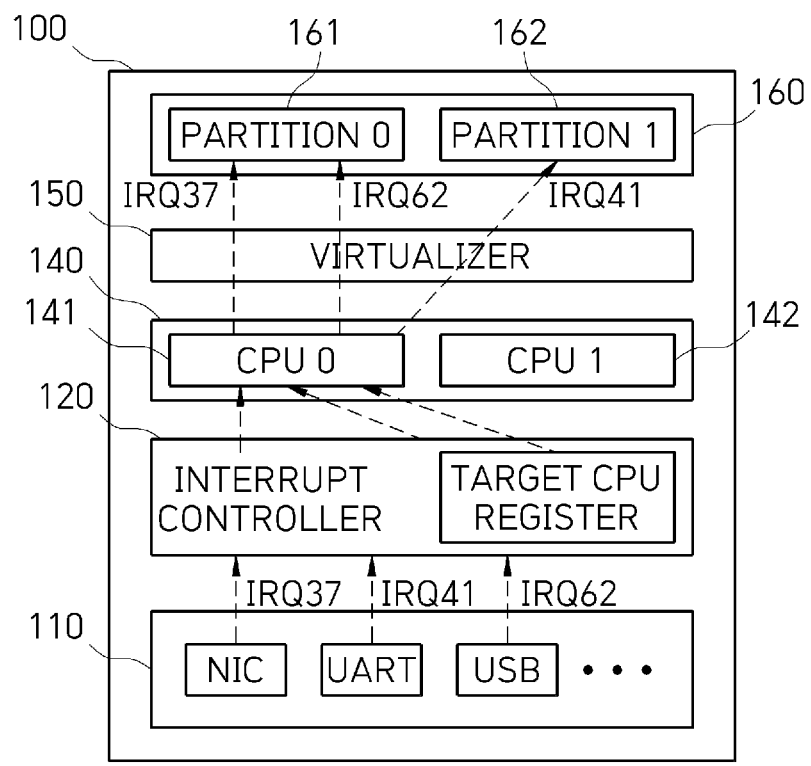
FIG. 5 shows an example of configuration control for a target CPU register according to an embodiment.

FIG. 5 shows an example of configuration control for a target CPU register according to an embodiment.

Referring to FIG. 5, when an interrupt IRQ41 is generated in the first peripheral device 111 related to the first partition 161, the first partition 161 may access the target CPU register 133 to perform configuration so that the interrupt IRQ41 is processed by the first CPU 141.

Since a conventional electronic device does not control interrupt configuration separately, the interrupt controller 120 may deliver, to the first CPU 141, the interrupt IRQ41 not allocated to the first CPU 141. When the interrupt IRQ41 is determined, the first CPU 141 may stop driving the first partition 161 and deliver the interrupt IRQ41 to the second partition 162. Thus, in the conventional electronic device, the driving of the first partition 161 to be processed by the first CPU 141 may be delayed.

However, when the first CPU 141 is designated as a target CPU of the interrupt IRQ41 in the target CPU register 133 by the first partition 161, the electronic device 100 according to an embodiment may check whether the interrupt IRQ41 is included in the first interrupt information related to the first partition 161. Also, the electronic device 100 may check whether the first CPU 141 designated as the target CPU is included in the first processor information. Since the ID of the first CPU 141 is included in the first processor information, but the interrupt IRQ41 is not included in the first interrupt information, the electronic device 100 may delete the configuration of the target CPU register 133 related to the interrupt IRQ41. Thus, according to an embodiment, the electronic device 100 can prevent the driving of the second partition 162 from being delayed due to the interrupt processing of the first partition 161.

Figure 6:
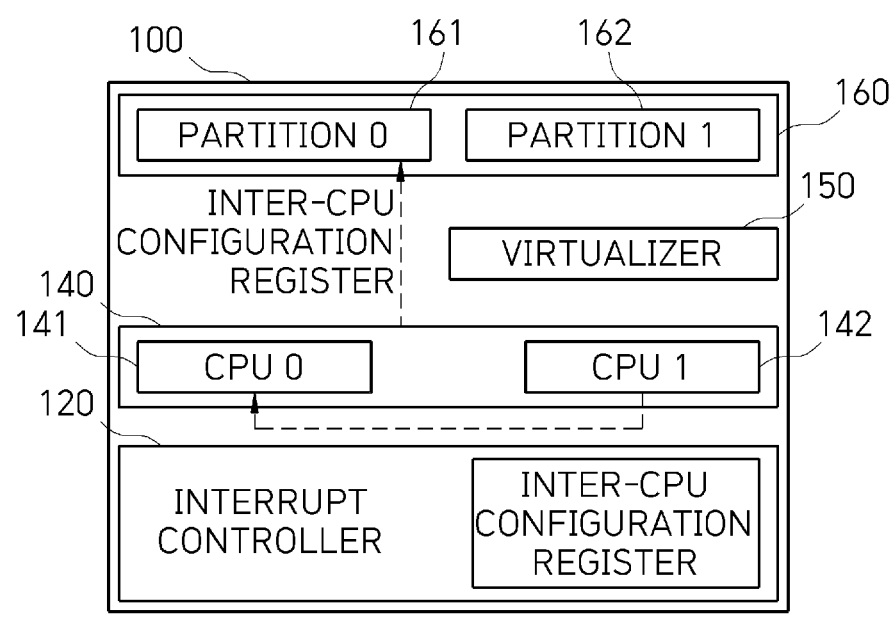
FIG. 6 shows an example of configuration control for an inter-CPU interrupt register according to an embodiment.

FIG. 6 shows an example of configuration control for an inter-CPU interrupt register according to an embodiment.

Referring to FIG. 6, the second partition 162 may access the inter-CPU register 131 and configure the generation of the inter-CPU interrupt for the first CPU 141.

Since a conventional electronic device does not control interrupt configuration separately, the interrupt controller 120 may deliver an inter-CPU interrupt to the first CPUE 141. In this case, the first CPU 141 may stop driving the first partition 161 in order to receive the inter-CPU interrupt. Thus, in the conventional electronic device, the driving of the first partition 161 to be processed by the first CPU 141 may be delayed.

However, when the inter-CPU interrupt whose target CPU is the first CPU 141 is configured for the inter-CPU register 131 by the second partition 162, the electronic device 100 according to an embodiment may check whether the ID of the first CPU 141 is included in the second processor information related to the second partition 162. Since the ID of the first CPU 141 is not included in the second processor information, the electronic device 100 may delete the configuration of the inter-CPU register 131 performed by the second partition 162.

Figure 7:
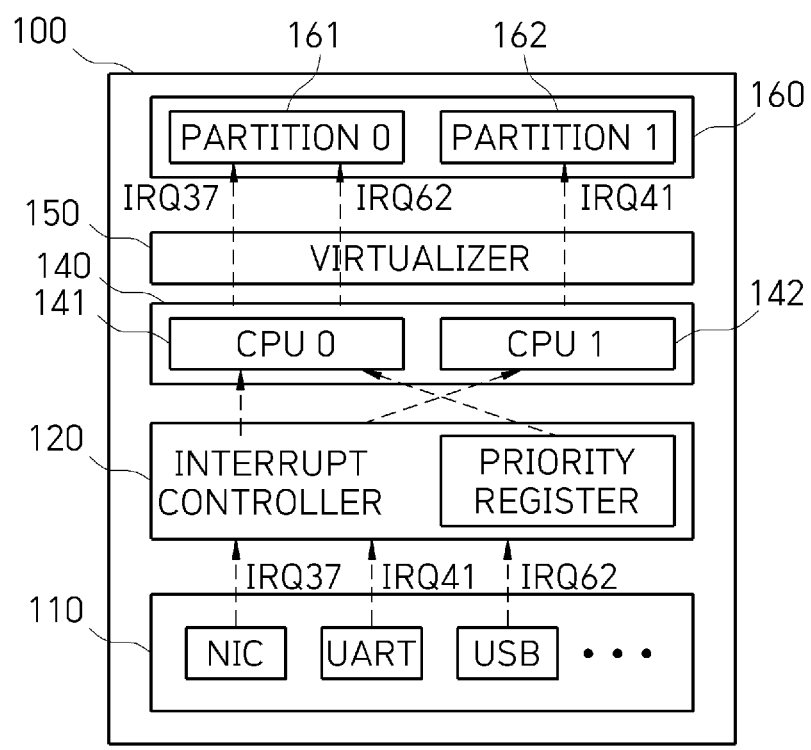
FIG. 7 shows an example of configuration control for a priority register according to an embodiment.

FIG. 7 shows an example of configuration control for a priority register according to an embodiment.

Referring to FIG. 7, the second partition 162 may access the priority register 137 and increase the priority of the interrupt IRQ41.

Since a conventional electronic device does not control interrupt configuration separately, the interrupt controller 120 may deliver the interrupt IRQ41 to the second CPU 142 according to the priority that is randomly increased by the second partition 162. When the interrupt IRQ41 is determined, the second CPU 142 may stop driving the first partition 161 and deliver the interrupt IRQ41 to the second partition 162. Thus, in the conventional electronic device, the driving of the first partition 161 may be delayed due to the interrupt processing of the second partition 162.

However, the electronic device 100 according to an embodiment may determine that the priority of the interrupt IRQ37 and the priority of the interrupt IRQ62 are decreased when the priority of the interrupt IRQ41 in the priority register 137 is increased by the second partition 162. In this case, the electronic device 100 may check whether the interrupts IRQ37 and IRQ62 are included in the second interrupt information related to the second partition 162. Since the interrupts IRQ37 and IRQ62 are not included in the second interrupt information, the electronic device 100 may delete (or restore) the configuration of the priority register 137 performed by the second partition 162.

Figure 8:
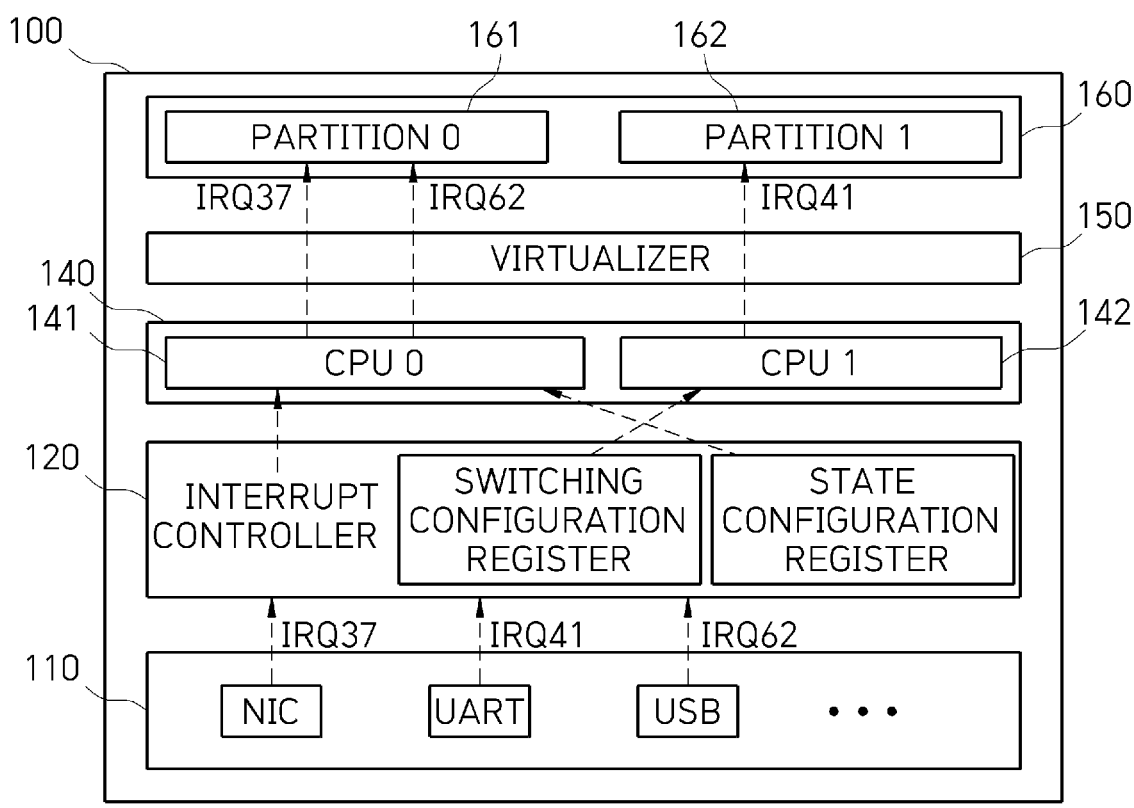
FIG. 8 shows an example of configuration control for a state configuration register or a switching configuration register according to an embodiment.

FIG. 8 shows an example of configuration control for a state configuration register or a switching configuration register according to an embodiment.

Referring to FIG. 8, the second partition 162 may access the state configuration register 135 or the switching configuration register 139 and change the configurations of the interrupt IRQ37 and the interrupt IRQ62.

Since a conventional electronic device does not control interrupt configuration separately, the interrupt controller 120 may control the interrupts according to the changed interrupts IRQ37 and IRQ62. Thus, in the conventional electronic device, the interrupt configuration may be changed by the second partition 162, which is not related to the interrupts IRQ37 and IRQ62, such that the first partition 161 may not detect the interrupt IRQ37 and IRQ62 or may receive an unnecessary interrupt.

However, when the configurations of the interrupts IRQ37 and IRQ62 are changed, the electronic device 100 according to an embodiment may check whether the changed interrupts IRQ37 and IRQ62 are included in the second interrupt information related to the second partition 162. Since the changed interrupts IRQ37 and IRQ62 are not included in the second interrupt information, the electronic device 100 may delete the configurations of the state configuration register 135 or the switching configuration register 139, which are related to the changed interrupts IRQ37 and IRQ62.

According to various embodiments disclosed herein, it is possible to control interrupt configuration between partitions or CPUs. In addition, it is possible to provide various advantageous effects that are directly or indirectly obtained through this document.

The various embodiments and the terms used herein are not intended to limit the technical features disclosed herein to specific embodiments and should be understood to include various modifications, equivalents, or alternatives of the corresponding embodiments. In describing the drawings, similar reference numerals may be used to designate similar or relevant constituent elements. The singular form of a noun corresponding to an item may include one or more items unless the context clearly indicates otherwise. Herein, phrases such as "A or B," "at least one of A and B," "at least one of A or B," "A, B, or C," "at least one of A, B, and C," "at least one of A, B, or C" may include any one or all possible combinations of items listed in the phrases. Terms such as "first" and "second" may simply be used to distinguish corresponding elements from the other elements, and the corresponding elements are not limited in other respects (e.g., importance or order). When a certain (e.g., first) element is referred to as being "coupled" or "connected" to another (e.g., second) element, with or without a term "functionally" or "communicatively", it means that the certain element can be connected to the other element directly (e.g., by wire), wirelessly, or via a third element.

The term "module" used herein may include a unit implemented in hardware, software, or firmware and may be used interchangeably with, for example, terms such as logic, logic block, component, or circuit. The "module" may be an integrated component, a minimum unit for performing one or more functions, or a part thereof. For example, according to an embodiment, the "module" may be implemented in the form of an application-specific integrated circuit (ASIC).

Various embodiments disclosed herein may be implemented by software (e.g., a program) including one or more instructions stored in a storage medium (e.g., an internal memory or an external memory; the memory 170) readable by a machine (e.g., the electronic device 100). For example, a processor (e.g., the processor 140) of the machine (e.g., the electronic device 100) may call and execute at least one of the one or more instructions stored in the storage medium. This allows the machine to be operated to perform at least one function in accordance with the at least one called instruction. The one or more instructions may include code generated by a compiler or code executable by an interpreter. The machine-readable storage medium may be provided in the form of a non-transitory storage medium. Here, the term "non-transitory" merely denotes that the storage medium is tangible and does not include a signal (e.g., electromagnetic waves), irrespective of whether data is semi-permanently or temporarily stored in the storage medium.

According to an embodiment, the method according to various embodiments disclosed herein may be included and provided in a computer program product. The computer program product may be traded between a seller and a purchaser as a commodity. The computer program product may be distributed in the form of a machine-readable storage medium (e.g., compact disc read-only memory (CD-ROM)) or may be distributed (e.g., downloaded or uploaded) via an application store (e.g., PlayStore™), directly between two user devices (e.g., smartphones), or online. For online distribution, at least a portion of the computer program product may be at least provisionally generated or temporarily stored in a machine-readable storage medium such as a memory of a manufacturer's server, an application store's server, or a relay server.

According to various embodiments, each of the above-described elements (e.g., modules or programs) may include one or more entities. According to various embodiments, one or more of the above-described elements or operations may be omitted, or one or more other elements or operations may be added. Alternatively or additionally, a plurality of elements (e.g., modules or programs) may be integrated into one element. In such a case, the integrated element may perform one or more functions of each of the plurality of elements in the same or similar manner as being performed by the corresponding one among the plurality of elements prior to the integration. According to various embodiments, operations performed by a module, a program, or other elements may be executed sequentially, in parallel, repeatedly, or heuristically. One or more of the operations may be omitted or executed in different orders. Alternatively, one or more other operations may be added.

What is claimed is:

1. An electronic device comprising:
   at least one peripheral device;
   a processor;
   an interrupt controller configured to manage interrupts generated by the peripheral device and the processor on the basis of a register; and
   a virtualizer,
   wherein the virtualizer is configured to:
      virtualize a portion of the processor and a portion of the at least one peripheral device to generate a first partition;
      generate first interrupt information corresponding to an interrupt usable in the first partition;
      generate first processor information corresponding to at least the portion of the processor usable in the first partition;
      check whether a configuration of the register is related to at least one of the first interrupt information and the first processor information when the register is configured by the first partition;
      authenticate the configuration of the register when the configuration of the register is related to at least one of the first interrupt information and the first processor information; and
      determine writing, configurations for the register in the interrupt controller which are performed by the first partition, and
   wherein the virtualizer is configured to check whether an interrupt ID and a processor ID corresponding to the determined writing configuration are included in the first interrupt information and the first processor information corresponding to the first partition, respectively.

2. The electronic device of claim 1, wherein
   when the configured register is a target CPU register, the virtualizer checks whether the configuration of the register is related to the first interrupt information and the first processor information, and
   when the configuration of the register is related to the first interrupt information and the first processor information, the virtualizer authenticates the configuration of the register.

3. The electronic device of claim 1, wherein when the configured register is an inter-CPU register, the virtualizer checks whether the configuration of the register is related to the first processor information, and when the configuration of the register is related to the first processor information, the virtualizer authenticates the configuration of the register.

4. The electronic device of claim 1, wherein
   when the configured register is a priority register, a switching register, or a state configuration register, the virtualizer checks whether the configuration of the register is related to the first interrupt information, and
   when the configuration of the register is related to the first interrupt information, the virtualizer authenticates the configuration of the register.

5. The electronic device of claim 1, wherein the virtualizer checks whether the configuration of the register is related to at least one of the first interrupt information and the first processor information on the basis of whether an interrupt ID corresponding to the configuration of the register is included in the first interrupt information and whether a processor ID corresponding to the configuration of the register is included in the first processor information.

6. The electronic device of claim 1, wherein
   when the configuration of the register is not related to at least one of the first interrupt information and the first processor information, the virtualizer deletes the configuration of the register, and
   when the configuration of the register is related to at least one of the first interrupt information and the first processor information, the virtualizer maintains the configuration of the register until an interrupt corresponding to the configured register is processed by a register controller.

7. The electronic device of claim 1, wherein
   the first interrupt information includes interrupt ID information to be processed by the first partition and a second partition, and
   the first processor information includes ID information of a portion of the processor.

8. The electronic device of claim 1, wherein the virtualizer is configured to:
   virtualize another portion of the at least one peripheral device and another portion of the processor to generate a second partition;
   generate second interrupt information corresponding to an interrupt usable in the second partition; and
   generate second processor information corresponding to the other portion of the processor usable in the second partition.

9. The electronic device of claim 8, wherein when the same processor is allocated to the first partition and the second partition, the virtualizer generates the first processor information and the second processor information including time-division information of the same processor.

10. An interrupt configuration control method performed by a processor, the interrupt configuration control method comprising:
   checking a configuration of a register included in an interrupt controller when a first partition configures the register;
   checking whether the configuration of the register is related to at least one of first interrupt information and first processor information allocated to the first partition;
   authenticating the configuration of the register when the configuration of the register is related to at least one of the first interrupt information and the first processor information; and
   determining writing configurations for the register in the interrupt controller which are performed by the first partition,
   wherein an interrupt ID and a processor ID corresponding to the determined writing configuration are included in the first interrupt information and the first processor information corresponding to the first partition, respectively.

11. The interrupt configuration control method of claim 10, further comprising:
   virtualizing at least one of a portion of a processor and a portion of a peripheral device to generate a first partition;
   generating first interrupt information and second interrupt information corresponding to an interrupt usable in the first partition; and
   generating first processor information corresponding to at least the portion of the processor usable in the first partition.

12. The interrupt configuration control method of claim 10, wherein the checking of whether the configuration of the register is related to at least one of first interrupt information and first processor information comprises:
  checking whether the configuration of the register is related to the first interrupt information and the first processor information when the configured register is a target CPU register; and
  authenticating the configuration of the register when the configuration of the register is related to the first interrupt information and the first processor information.

13. The interrupt configuration control method of claim 10, wherein the checking of whether the configuration of the register is related to at least one of first interrupt information and first processor information comprises:
  checking whether the configuration of the register is related to the first processor information when the configured register is an inter-CPU register; and
  authenticating the configuration of the register when the configuration of the register is related to the first processor information.

14. The interrupt configuration control method of claim 10, wherein the checking of whether the configuration of the register is related to at least one of first interrupt information and first processor information comprises:
  checking whether the configuration of the register is related to the first interrupt information when the configured register is a priority register, a switching configuration register, or a state configuration register; and
  authenticating the configuration of the register when the configuration of the register is related to the first interrupt information.

15. The interrupt configuration control method of claim 10, wherein the checking of whether the configuration of the register is related to at least one of first interrupt information and first processor information comprises: checking whether the configuration of the register is related to at least one of the first interrupt information and the first processor information on the basis of whether an interrupt ID corresponding to the configuration of the register is included in the first interrupt information and whether a processor ID corresponding to the configuration of the register is included in the first processor information.

16. The interrupt configuration control method of claim 10, wherein the authenticating of the configuration of the register comprises: when the configuration of the register is related to at least one of first interrupt information and first processor information, maintaining the configuration of the register until an interrupt corresponding to the configured register is processed by a register controller.

17. The interrupt configuration control method of claim 10, further comprising, when the configuration of the register is not related to at least one of first interrupt information and first processor information, deleting the configuration of the register.

18. The interrupt configuration control method of claim 11, further comprising:
  virtualizing another portion of the peripheral device and another portion of the processor to generate a second partition;
  generating second interrupt information corresponding to an interrupt usable in the second partition; and
  generating second processor information corresponding to the other portion of the processor usable in the second partition.

19. The interrupt configuration control method of claim 18, wherein the generating of second processor information comprises, when the same processor is allocated to the first partition and the second partition, generating the second processor information including time-division information of the same processor corresponding to a usage time different from that of the first partition.

20. A non-transitory computer-readable storage medium storing processor-executable instructions, the instructions causing a processor of an electronic device to:
  check a configuration of a register included in an interrupt controller when a first partition configures the register;
  check whether the configuration of the register is related to at least one of first interrupt information and first processor information allocated to the first partition;
  authenticate the configuration of the register when the configuration of the register is related to at least one of the first interrupt information and the first processor information; and
  determine writing configurations for the register in the interrupt controller which are performed by the first partition,
  wherein an interrupt ID and a processor ID corresponding to the determined writing configuration are included in the first interrupt information and the first processor information corresponding to the first partition, respectively.

* * * * *